May 5, 1964
W. N. CARSON, JR
3,132,054
BATTERY ELECTRODE COMPOSITIONS
Filed Feb. 15, 1961
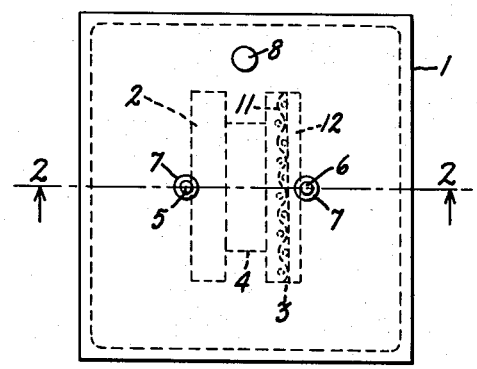
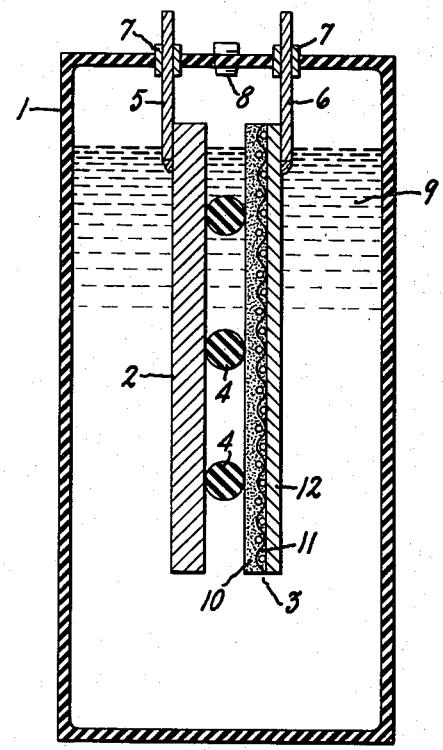
INVENTOR.
William N. Carson Jr.
BY
Paul A. Frank
His Attorney 3,132,054
BATTERY ELECTRODE COMPOSITIONS
William N. Carson, Jr., Scotia, N.Y., assignor to General
Electric Company, a corporation of New York
Filed Feb. 15, 1961, Ser. No. 89,384
2 Claims. (Cl. 136—137)

This invention pertains generally to electrode compositions suitable for a primary liquid electrolyte type battery. More particularly, the present invention pertains to electrode compositions which are especially useful for a high discharge rate battery, the electrodes prepared from such compositions, and the method of preparation thereof. Specifically, the present invention relates to the fabrication of an electrode by a pasting technique whereby an electrically conducting network is formed in the final electrode.

It will be advantageous to minimize the internal resistance in a high discharge rate battery. Low internal resistance in a battery permits high operating currents with the same voltage drop. In contrast thereto, the operation of a primary battery having a large internal resistance at high current loads causes excessive voltage drop across the battery. Thus, a high rate of discharge places a premium upon low internal electrical resistance in the battery. Additionally, it is desirable to have a rapid activation of the primary battery upon addition of the liquid electrolyte. For most types of primary batteries, the activation time is decreased by lower internal resistance in the battery.

A lower internal resistance can be obtained in most liquid electrolyte batteries by lowering the resistance of the electrodes. The problem of lowering electrode resistance in a primary battery is accentuated, however, since many of the active electrode materials are poor electrical conductors in the solid state. More specifically, the composition of the electrode adds resistance to the battery because of the relatively insulative character of the active electrode material. By "active electrode material" is meant the electrochemically active substance in the electrode which produces electrical power by means of reacting with the liquid electrolyte.

It is known to lower the internal resistance of a primary battery by forming an electrically conducting network in the electrode. One method heats a mixture of the active electrode material with an inert metal to obtain a sintered composition having a conducting network of the metal. The heating step is generally detrimental to many active electrode materials unless accomplished in a protective atmosphere and performed with materials which have only limited reactivity. Another method prepares an electrode having a conducting network by mechanical means whereby a dry powdered mixture of the active electrode material and a metallic reinforcing agent is subjected to sufficient pressures to bond the individual particles in the mixture. The active electrode material is cold-weldable metal, such as lead or cadmium, and the bond is obtained by a cementing action of this metal. In this method, large excess of the active material is required in the electrode over that needed for the electrochemical reaction in order to preserve the electrically conducting network during operation of the battery. A still more recent method for fabrication of an electrode having an electrically conducting network therein compacts a mixture of an electrochemically active inorganic salt with a sufficient amount of crystalline electriaclly conductive material to form a conducting network in the electrode. A complete disclosure of this method may be found in an application of Robert S. Shane for the United States Letters Patent, Serial No. 93,584, entitled, "Battery Electrode Compositions," filed March 6, 1961, and assigned to the assignee of the present invention. It would be desirable to fabricate electrodes with electrochemically active inorganic salts by a method which obviates the expensive and often complex apparatus required to produce sufficient pressures for preparation by a compacting technique. The pasting technique is a known method for preparation of electrodes without need for a pressing operation, but this method has heretofore resulted in electrodes having relatively high electrical resistance.

It is a primary object of the invention, therefore, to provide a method for the preparation of low resistance electrodes by a pasting technique.

It is another important object of the invention to provide novel compositions which are especially suitable for the preparation of electrodes by a pasting technique.

It is still another important object of the invention to provide improved high discharge rate primary batteries utilizing electrodes prepared by a pasting technique.

Other objects and advantages will be apparent from the following description and drawings.

Briefly, the present method for preparation of an electrode comprises wetting a powdered mixture containing an electrochemically active material with sufficient amounts of a liquid solvent to provide a smooth consistency paste, thereafter spreading the paste in the electrode configuration onto a suitable substrate, and removing the liquid solvent. The major portion of the powdered electrode mixture comprises discrete particles of the electrochemically active material having uniformly interspered therein sufficient amounts of a finely divided crystalline electrically conductive solid to form a conducting network in the electrode. There is also uniformly dispersed in the powdered electrode mixture smaller amounts of a soluble binder to adhere the mass of active particles in the electrode. The powdered electrode mixture contains an antioxidant to protect the electrochemically active particles against air oxidation during the pasting operation. In view of the fact that the electrode mixture contains significant propertions of non-conducting or poorly conducting agents such as the antioxidants and binders, it is considered surprising that a low resistance electrode is produced from the mixture. While the exact nature of the mechanism which forms a conducting network in the electrode is not known at this time, the network formation is due at least in a significant part to the coating of the electrochemically active particles with the electrically conductive solid together with deposition of the electrically conductive solid in the void spaces amongst electrochemically active particles. By means of the present invention, it will be seen that a wide variety both of active electrode materials and crystalline electrically conductive materials may be employed to form electrodes having the desired properties.

The invention is practiced in a preferred embodiment as illustrated in the following description taken in connection with the accompanying drawings. There is shown in the preferred embodiment a magnesium-cuprous chloride battery which can be activated rapidly merely by the addition of sea water to the dry battery.

FIGURE 1 is a plan view of one form of a magnesium-cuprous chloride sea water battery; and
FIGURE 2 is a sectional view taken along lines 2—2 of FIGURE 1.

FIGURE 2 shows in detail the structure of the preferred battery which comprises generally an assembly of a case 1 for containing the liquid electrolyte, a magnesium anode 2, a cuprous chloride cathode 3 and insulating means 4 for physically spacing the electrodes. External connection to the anode and cathode respectively are provided by internal leads 5 and 6 with external terminals 7. A plug 8 is provided in the top surface of the battery case for admission of the salt water electrolyte 9. Magnesium anode 2 comprises a rectangular flat sheet of approximately 0.030 inch thickness and has the copper connecting lead soldered directly to the rear side of the sheet. Cuprous chloride cathode 3 comprises a three-member assembly wherein a pasted cuprous chloride layer 10 is embedded in a copper screen 11, the copper screen being soldered directly to an 0.002 inch thick rectangular copper collector plate 12. The cathode member is fabricated by first soldering the screen element 11 to the collector plate 12 preferably with soft solder such as 60–40 lead-tin mixture fluxed with rosin type fluxes in such a manner that only copper and not soft solder is in contact with the cuprous chloride mixture 10. Contact of soft solder with the cuprous chloride mixture leads to replacement of copper from the cuprous chloride powder by lead and tin thereby forming the respective chlorides which are very hygroscopic and initiate a marked attack by humidity on the electrode during ordinary storage. The cuprous chloride pasting composition is spread directly onto the soldered screen member and collector plate assembly preferably with a doctor blade for the purpose of controlling thickness and density of the paste. The pasted member is dried at moderately elevated temperatures for a sufficient time to remove the solvent. Connecting lead 6 is soldered to the back side of collector plate 12 with soft solder. Connecting leads 5 and 6 preferably comprise 0.020 inch diameter copper wire and can be insulated to reduce possible corrosion of the leads by sea water during operation of the battery. Assembly of the anode and cathode members in the battery is accomplished merely by attaching connecting leads 5 and 6 to terminals 7 and inserting insulative spacers 4 between the facing sides of the electrodes. For simplicity of illustration, insulative spacers 4 are shown in FIGURES 1 and 2 as being unsupported. These elements may be attached to either of the electrodes or to the battery case in a conventional manner. Battery case 1 is preferably fabricated from a formable non-conducting solid, such as rubber, glass, polymers, etc. Examples 1–3 illustrate preferred pasting compositions for a cuprous chloride cathode in the above type battery. These examples will also serve to further point out the method for fabrication of the cathode element within the contemplation of the present invention. Wherever parts and percentages appear hereinafter in the specification and claims, reference is to parts and percentages by weight unless otherwise specified.

EXAMPLE 1

A powdered electrode mixture was prepared by adding 20 parts crystalline graphite having a particle size less than 250 mesh U.S. screen size, 75 parts cuprous chloride of particle size approximately 100 mesh U.S. screen size, 5 parts of the sodium salt of carboxy methyl cellulose and 1 part resorcinol into a Y-type blender and commingling the mixture for approximately 1 hour at room temperature to produce a free-flowing uniform composition. A pasting composition was prepared by wetting the powdered mixture with approximately 6 parts water and mechanically stirring the product for a sufficient period to produce a smooth consistency paste. The wet paste was spread onto the soldered cathode assembly hereinbefore described with a doctor blade to control thickness and density of the deposited layer. The final electrode was obtained by drying the deposited layer in an air circulating oven at temperatures of approximately 100–150° C. for one hour.

The performance characteristics of a 1 1/16 inch diameter electrode containing 1.1 grams of the dry paste were measured. The electrical resistance of the electrode was comparable to a similar size silver chloride electrode not containing additives even though cuprous chloride, the major constituent in the present electrode, has an electrical conductivity less than 1% of the conductivity of silver chloride. The combination of the above prepared cathode with a magnesium anode in a sea water battery of the type illustrated in the drawings achieved 90% steady operating voltage within 20 seconds after immersion in a 1.5% sodium chloride solution at 0° C.

EXAMPLE 2

A pasted electrode was prepared substantially according to the method of Example 1 except that for the dry powdered electrode mixture employed therein there was substituted a mixture comprising 80 parts of the cuprous chloride, 15 parts of the crystalline graphite, 3 parts sodium salt of carboxy methyl cellulose, 1 part resorcinol, and 0.1 part polyethylene glycol-polypropylene glycol nonionic type surfactant. The operating characteristics of the pasted electrode prepared from the above mixture were substantially comparable to the results obtained in Example 1.

Additionally, the present electrode had significantly better humidity resistance than the electrode of Example 1 by reason of the incorporation of a nonionic surfactant into the electrode mixture. Thus, the cuprous chloride material in this electrode was not hydrolyzed to water soluble cupric chloride which causes cell disintegration and the electrode was stable for periods of six months under ordinary storage conditions.

EXAMPLE 3

To illustrate still other electrode compositions within the contemplation of the present invention together with other methods useful for the preparation of the pasted electrode, there is added to the powdered mixture certain reducing agents, such as polyvinyl alcohol, which upon heating converts a surface portion of the active electrode particles to the conducting metallic state. Also, the active electrode materials in the present example comprise cuprous chloride and a minor amount of silver chloride to further improve the conductivity characteristics of the final electrode. During the heating step, the cuprous chloride and/or silver chloride particles in the mixture are partially reduced by the polyvinyl alcohol to copper and silver, respectively, and assist formation of the electrically conducting network in the electrode.

Accordingly, a powdered electrode mixture was prepared by adding 72 parts cuprous chloride having a particle size of approximately 100 mesh U.S. screen size, 5 parts silver chloride having a particle size of less than 250 mesh U.S. screen size, 15 parts crystalline graphite having a particle size less than 200 mesh U.S. screen size, 5 parts polyvinyl alcohol, and 3 parts hydroquinone monomethyl ether into a ball mill and grinding together for approximately one hour at room temperature. It will be noted from the absence of any other soluble binder in the powdered electrode mixture that the polyvinyl alcohol constituent in the composition served the dual function of a binder as well as a reducing agent. A pasting composition was prepared by adding 10 parts water to the powdered mixture and mechanically stirring the product for a sufficient period to produce a smooth consistency paste. An electrode was obtained from the pasting composition in the same general manner as hereinbefore described except that the solvent for the polyvinyl alcohol binder was removed and the chlorides in the composition partially reduced all in a single operation which consisted of heating the wet pasted electrode to approximately 250–300° C. for approximately one hour. The operating characteristics of the above prepared electrode were significantly improved compared to like characteristics for the electrodes prepared in Examples 1 and 2.

The powdered electrode mixtures of the present invention are electrochemically active compositions which comprise mixtures of a particulate active electrode solid, a soluble binder, an antioxidant, and a sufficient amount of a crystalline electrically conductive material to form a conductive network in the final electrode. Thus, the compositions are best characterized by the properties of the final electrode wherein the crystalline network forming particles are so dispersed therein as to form a substantially continuous conducting network in a matrix of an adherent mass of the bonded electrode particles. More particularly, the physical structure of the electrode prepared from the powdered mixture according to the invention is a unitary mass of adherent active electrode particles resulting from the cementing action of the binder which also contains a substantially continuous network of the crystalline electrically conductive material. The relationship of the network forming particles to the electrochemically active particles in the final electrode must be one that includes partial coating of the active particles with the network forming particles. To achieve this relationship, it has been found necessary in the preparation of the powdered electrode mixture to blend together network forming particles which are smaller in size than the active electrode particles. The desirable shape for the network forming particles which most easily assumes the required relationship in the final electrode is one having a relatively high ratio of surface area to volume. The network forming materials are crystalline solids which possess greater electrical conductivity than the electrochemically active electrode material and which are insoluble in the liquid electrode. The network forming materials are all necessarily crystalline in physical form since amorphous materials do not effectively lower electrode resistance. Typical electrically conductive substances for incorporation in a cuprous chloride electrode mixture include metals such as silver, copper, aluminum, and gold; alloys such as gold-silver and German silver; inorganic salts such as silver chloride and the allotropic form of boron nitride; and non-metallics such as crystalline graphite. From this list, it is noteworthy that suitable network forming materials can include both electrochemically active substances as well as electrochemically inert substances. Electrochemically inert substances are preferred to assist preservation of the network during operation of the electrode.

The proportions of the crystalline electrically conductive material and the electrochemically active material in the mixture may vary widely. A decrease in the electrical resistance of the electrode is obtained with as little as 2 parts of the crystalline electrically conductive material per 98 parts of the electrochemically active material. Generally, the electrical resistance is not further decreased in mixtures containing greater than 50 parts of the electrochemically active material. It is desirable to limit the proportion of crystalline electrically conductive material to an equi-part mixture for greater efficiency of electrode operation.

The active electrode materials which can be benefited by the practice of the invention are generally described as insoluble inorganic salts possessing poor electrical conductivity characteristics. The cation portion of the salt is heavy metal element usually in the lower valence form and typical elements include copper, silver, lead mercury, and thallium. The anion portion of the salt can be selected from the group consisting of halogens and pseudohalogens. By "pseudohalogens" it is meant those monovalent radicals including cyanide (CN), azodithiocarbonate ($CS_2N_3$) and thiocyanate (CNS) groups which behave chemically as halogens in at least two respects, namely, (1) the group reacts with the heavy metal element to form a water-insoluble salt, and (2) upon hydrolysis, the group forms both hydroacid and hypo-ous acid products, e.g., $H_2O + (CN)_2 \rightarrow HCN + HCNO$.

The preferred electrode mixtures are suitable for the cathode member in a sea water battery when used in combination with an anode prepared from such materials as magnesium and aluminum. Preferred cathode mixtures comprise 70–80 parts cuprous chloride, 15–20 parts of an inert electrically conductive material, 3–5 parts of a soluble binder, and 1–5 parts of an antioxidant. Optionally, up to 10 parts by weight in the cathode mixture of an auxiliary electrically conductive material which is also an electrochemically active substance, such as silver chloride, has proved especially beneficial as was illustrated in Example 3 above. As substitutes for the cuprous chloride active material in the preferred compositions, there may be employed other relatively insoluble and non-hygroscopic copper salts such as cuprous thiocyanate, cuprous bromide, cupric acetylacetonate and other complex cupric or cuprous salts. The incorporation of a surfactant in the preferred compositions improves the humidity resistance of the final pasted electrode during storage in the inactive state. As substitutes for the polyethylene glycol-propylene glycol surfactant employed in the above examples, there may be selected one or more of the class of well-known anionic, cationic, or nonionic surfactants which is a water-dispersible solid. To illustrate the operating characteristics of the preferred electrode compositions, the capacity of the cathode element in a sea water battery of the type hereinbefore described is approximately 200–250 milliamperes per square inch and the battery generally achieves at least 90% of operating voltage within 30 seconds after activation.

The reducing agents added to the electrode mixtures are organic materials which upon thermal decomposition reduce at least a portion of the active electrode material to the metallic state. Satisfactory reducing agents can be characterized as being easily dehydrogenated and include those organic materials having aldehyde, alcohol, or ketone groups. Preferred reducing agents are polymers having the mentioned functional groups to permit sufficient dehydrogenation at the elevated temperatures for reduction of the active electrode materials before volatilization.

The binder system for the pasting composition comprises a dispersion of the soluble binder in a volatile solvent therefor. By "dispersion" is meant the complete or partial solution of the binder in the solvent which occurs during the mixing operation for preparation of the pasting compositions. Suitable binders for the electrode mixtures can be selected from a broad class of materials including hydrophilic colloids such as polyvinyl alcohol, agar-agar, gum arabic, starch, etc.; heavy metal salts including halides, thiocyanates, stearates, palmitates, oleates, ethylacetoacetates, and acetylacetonates; as well as soluble polymers including polystyrene, vinylacetate-maleic anhydride copolymers, urea-formaldehyde resins, and novolacs. It will be noted that certain binders also perform other functions in the composition. For example, polyvinyl alcohol is both a suitable binder and a reducing agent in the composition. Likewise, cuprous thiocyanate is both a suitable binder as well as an auxiliary electrochemically active material for the preferred cuprous chloride electrode mixtures. Relatively minor amounts of the binder are adequate for adherence of the electrochemically active particles in the dry pasted electrode and amounts up to 5% based on the weight of the powdered electrode mixture may be employed without substantially reducing the electrical conductivity of the electrode prepared therefrom. Suitable solvents for the binder system are inorganic and organic liquids which dissolve the particular binder and which can be removed from the pasting compositions at moderately elevated temperatures in air. The heating of the pasting composition at temperatures above approximately 350° C. for removal of the solvent is not recommended since undesirable reaction between the constituents in the composition occurs at such elevated temperatures. The proportion of solvent in the pasting composition generally varies from about 6–20% by weight of the solid mixture in the pasting composition, this amount being adequate to wet substantially all of the electrochemically active particles so as to provide a unitary adherent mass of the electrochemically active particles in the final electrode. Table 1 below illustrates suitable solvents for binders which have been found particularly useful in the preferred cuprous chloride mixtures of the invention.

*Table 1*

| Binder | Solvent |
|---|---|
| Starch | Water. |
| Gum arabic | Do. |
| Agar-agar | Do. |
| Polyvinyl alcohol | Do. |
| Cupric fluoride | Ethyl alcohol. |
| Cupric chloride | Methyl alcohol. |
| Cupric bromide | Ethyl alcohol. |
| Do | Acetone. |
| Cupric acetylacetonate | Chloroform. |
| Cupric ethylacetoacetate | Ethyl alcohol. |
| Cupric oleate | Ethyl ether. |
| Cupric palmitate | Carbon tetrachloride. |
| Cupric stearate | Chloroform. |
| Cuprous thiocyanate | Ethyl ether. |
| Polystyrene | Toluene. |

Many of the organic and inorganic binders listed in the above table also serve to protect cuprous chloride from hydrolysis to cupric chloride during storage at ordinary conditions of humidity.

The antioxidants in the electrode mixtures prevent undesirable air oxidation of the primary electrochemically active material during the pasting operation. Suitable antioxidants are well known and can be selected from the general class of antioxidants which are stable at the elevated temperatures employed to remove the solvent from the pasting composition. Typical antioxidants include organic compounds such as resorcinol, hydroquinone monomethyl ether, tertiary butyl phenol and others. Phenol derivatives comprising alkyl and alkoxy substituted phenols are the preferred antioxidants since these materials serve also to provide humidity protection for the electrochemically active materials in the electrode. Up to 5% of the antioxidant based on the total weight of the powdered mixture can be employed without substantially reducing the electrical conductivity of the electrode.

From the foregoing description, it will be apparent that a method for decreasing the internal resistance in a battery by modifying the electrode member in a particular manner has been provided. Furthermore, novel electrode compositions have been shown which are especially suitable for the practice of the invention. It is not intended to limit the invention to the preferred embodiments above shown, since it will be obvious to those skilled in the art that certain modifications of the present teaching can be made without departing from the true spirit and scope of the invention. It is intended to limit the present invention, therefore, only to the scope of the following claims.

What I claim as new and desire to secure by Letters Patent of the United States is:

1. A composition for making a battery electrode comprising a mixture of 70–80 parts cuprous chloride, 3–5 parts sodium salt of carboxy methyl cellulose, 1–3 parts of a stable organic antioxidant selected from the group consisting of alkyl and alkoxy substituted phenols, and 15–20 parts graphite.

2. A composition for making a battery electrode comprising a mixture of 70–80 parts cuprous chloride, 3–5 parts sodium salt of carboxy methyl cellulose, 1–3 parts of a stable organic antioxidant selected from the group consisting of alkyl and alkoxy substituted phenols, 15–20 parts graphite, and up to 5 parts of a surfactant.

References Cited in the file of this patent

UNITED STATES PATENTS

| | | |
|---|---|---|
| Re. 23,882 | Chubb | Oct. 5, 1954 |
| 2,322,210 | Adams | June 22, 1943 |
| 2,655,551 | Ellis | Oct. 13, 1953 |
| 2,759,036 | Greenburg et al. | Aug. 14, 1956 |
| 2,816,154 | Mendelsohn | Dec. 10, 1957 |
| 2,836,645 | Morehouse et al. | May 27, 1958 |
| 2,872,498 | Granger | Feb. 3, 1959 |